US007549231B1

(12) United States Patent
Neubauer

(10) Patent No.: US 7,549,231 B1
(45) Date of Patent: Jun. 23, 2009

(54) TRUSSETTER GAUGE

(76) Inventor: Joachim H. Neubauer, 11 Bloomfield St., Skowhegan, ME (US) 04976

( * ) Notice: Subject to any disclaimer, the term of this patent is extended or adjusted under 35 U.S.C. 154(b) by 750 days.

(21) Appl. No.: 10/949,836

(22) Filed: Sep. 24, 2004

(51) Int. Cl.
*B43L 7/14* (2006.01)
*G01B 5/24* (2006.01)

(52) U.S. Cl. .............................. 33/464; 33/417; 33/613

(58) Field of Classification Search ................... 33/464, 33/415, 416, 417, 465, 473, 613
See application file for complete search history.

(56) References Cited

U.S. PATENT DOCUMENTS

| | | | | | |
|---|---|---|---|---|---|
| 144,003 | A | * | 10/1873 | Waterbury | 33/465 |
| 380,360 | A | * | 4/1888 | Spencer et al. | 33/473 |
| 888,070 | A | * | 5/1908 | Dissell | 33/464 |
| 945,684 | A | | 1/1910 | Blair | |
| 1,039,057 | A | * | 9/1912 | Hill | 33/464 |
| 2,875,523 | A | * | 3/1959 | Fay | 33/416 |
| 3,279,077 | A | | 10/1966 | Schiler | |
| 4,451,993 | A | * | 6/1984 | Yauk | 33/464 |
| 4,503,615 | A | | 3/1985 | Schreiber | |
| 4,525,933 | A | * | 7/1985 | Patterson | 33/470 |
| 4,599,805 | A | * | 7/1986 | Padilla | 33/464 |
| 4,704,829 | A | * | 11/1987 | Baumker, Jr. | 33/613 |
| 4,882,846 | A | * | 11/1989 | Reed | 33/464 |
| 4,986,052 | A | | 1/1991 | Nelson | |
| 5,384,967 | A | * | 1/1995 | Helmuth | 33/416 |
| 5,440,818 | A | * | 8/1995 | Mailhot | 33/464 |
| 5,758,428 | A | * | 6/1998 | Kotlinski | 33/416 |
| 6,105,266 | A | * | 8/2000 | Cote | 33/464 |
| 6,260,283 | B1 | * | 7/2001 | Abernathy et al. | 33/419 |
| 7,082,692 | B2 | * | 8/2006 | Shapiro | 33/473 |
| 7,165,333 | B1 | * | 1/2007 | Abdulkader | 33/417 |

* cited by examiner

*Primary Examiner*—Christopher W Fulton
(74) *Attorney, Agent, or Firm*—Daniel S. Ortiz

(57) ABSTRACT

The invention is a portable trussetter gauge for quickly and accurately marking a predetermined distance from an overhanging end of a truss to a position on a crossbeam. The trussetter gauge has a first elongated member with a marking end lockably engaged with a locking and aligning member which is movable relative to a longitudinal axis of the first elongated member. A second elongated member is lockably engaged with the locking and aligning member and movable perpendicular to the longitudinal axis of the first elongated member. The portable trussetter gauge can be foldable.

5 Claims, 11 Drawing Sheets

TRUSSETTER GAUGE

BACKGROUND OF THE INVENTION

The invention relates to a device for accurately marking a distance from an overhanging end of a truss to a point on a cross beam of the truss.

As used in building construction, and particularly in structures having pitched roofs, a truss comprises a crossbeam which rests on the walls of the structure and a sloping member which supports the roof. An end of the sloping member generally extends below the level of the crossbeam and is cut off at an angle which is perpendicular to the axis of the crossbeam. Since the end of the sloping member is at a level below the crossbeam, it is difficult to mark a point on the crossbeam which is at a required distance from the end of the sloping member. It is necessary to mark the crossbeam so that a uniform overhang can be provided to each truss.

In modern construction methods, trusses are prefabricated and shipped to the construction site for mounting on the walls of the structure. To rapidly set the truss on the walls of a structure with a uniform overhang, a line is marked on the top plate of a wall and a mark is made on the crossbeam of the truss at the point at which the crossbeam of the truss is to meet the line on the top plate of the wall.

RELATED ART

U.S. Pat. No. 4,986,052 discloses a truss setting system and the difficulty in setting a truss on a structure.

U.S. Pat. No. 4,503,615 discloses a guide structure for locating blank spaces on a form. The device has vertical and horizontal members which are movable relative to each other. However, the angular relationship between the two members is determined by attachment with the edges of the form.

U.S. Pat. No. 3,279,077 discloses a machine tool measuring devise. The measuring device has a vertical and a horizontal member movable relative to each other. The device is useful for measuring the accuracy and contour of machined parts. The device requires mounting on a fixed base and is not portable or foldable.

U.S. Pat. No. 945,684 discloses a device for determining the length and angles of rafters, hips and valleys of roofs.

The trussetter device of the invention provides a means for quickly and accurately marking the point on the crossbeam of a truss which is to be aligned with a line marked on the top plate of a wall.

BRIEF DESCRIPTION OF THE INVENTION

According to the invention, a portable trussetter gauge is provided for quickly and accurately marking a crossbeam of a truss at a point a fixed distance from the end of the truss along the axis of the crossbeam.

The trussetter gauge comprises: a first elongated member having a first longitudinal axis and a marking end; a locking and aligning member movably engaged with the first elongated member; a second elongated member having a second longitudinal axis, movably engaged with the locking and aligning member and arranged so that the second elongated member is at least movable perpendicular to the first longitudinal axis; the locking and aligning member is arranged to permit the first and second elongated members to be movable relative to each other and to releasably lock the first and second members in a fixed relationship.

In a preferred embodiment the trussetter gauge can be foldable to place the first and second longitudinal axes substantially parallel to each other.

In a second preferred embodiment, the position of the first and second elongated members in relation to each other are independently lockable.

DETAILED DESCRIPTION OF THE INVENTION

The trussetter gauge of the invention is portable and can be readily carried by a tradesman. In particular, a folding embodiment can be readily transported in a portable carpenter's tool box. The same numbers will be used to refer to the same articles in describing the Figures.

Figure 1:
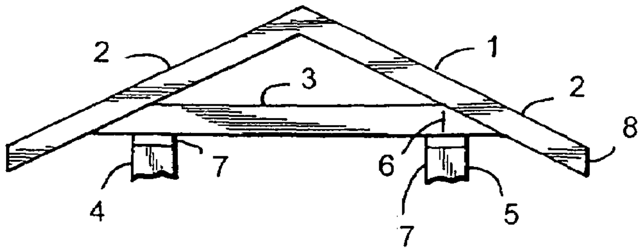
FIG. 1 PRIOR ART
FIG. 1 is a diagrammatic representation of a truss.

FIG. 1 shows a simple truss 1 having sloping members 2 and a crossbeam 3 resting on walls 4 and 5 of a structure. The crossbeam has been marked at 6 and set so that mark 6 is aligned with a line (not shown) marked on the wall top plate 7. The mark 6 is made a fixed distance on a line which is perpendicular to the plane of the end 8 of sloping member 2. Since the end 8 of sloping member 2 is below the crossbeam 3, before the present invention, it was difficult to accurately and quickly mark the point 6 on crossbeam 3.

Figures 2, 2A:
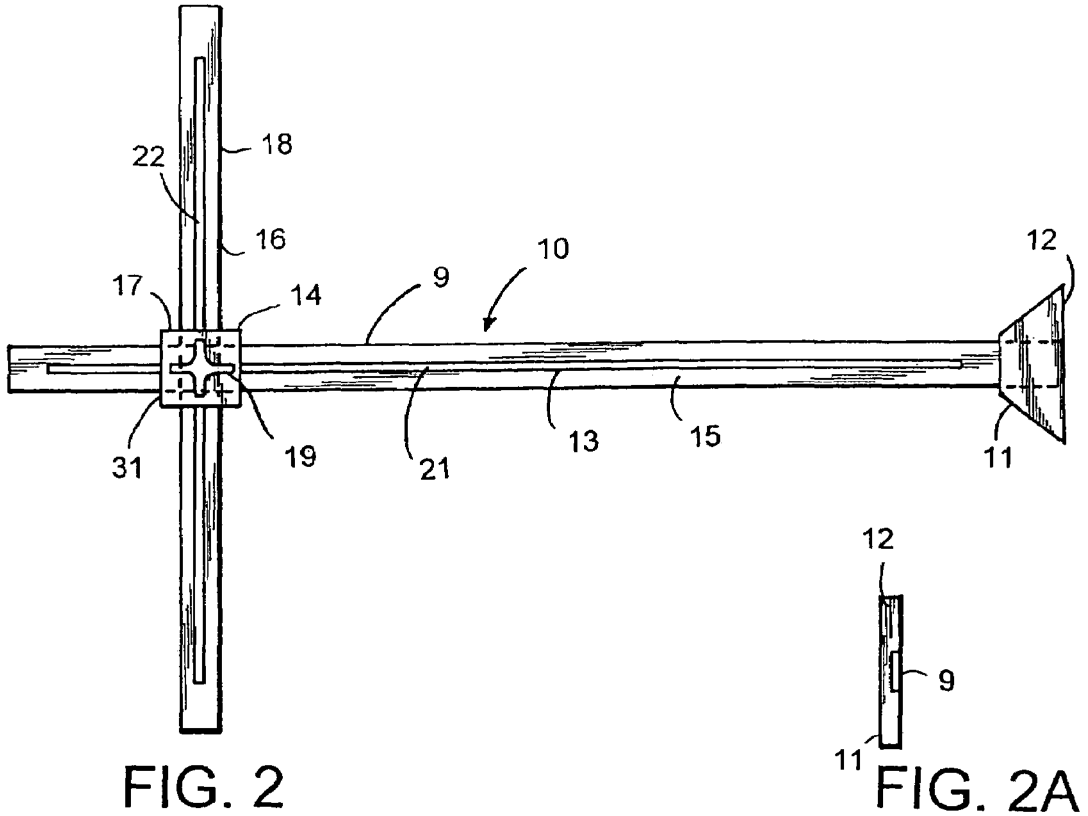
FIG. 2 is a diagrammatic representation of a plan view of a trussetter gauge of the invention.
FIG. 2A is a view of the marking end from the side.

FIG. 2 is a plan view of the trussetter gauge 10 of the invention showing first elongated member 9 having a marking end 11 with a marking edge 12. As shown, the elongated member 9 has a slot 13 extending along or parallel to its longitudinal axis. The need for slot 13 is dependent upon the design of the locking and aligning member 14 and in some embodiments is not required.

The first elongated member 9 as shown does not have measuring indicia; however, it is preferred that measuring or some arbitrary indicia be present on the top face 15 of first elongated member 9. The indicia can be in the United States or metric systems or both.

The locking and aligning member 14 is movable relative to the first elongated member toward and away from the marking end 11. The first elongated member passes through alignment channel 31 shown in dotted lines in locking and aligning member 14. The alignment channel 31 aligns the first elongated member 9 in relation to the locking and aligning member 14.

A second elongated member 16 is arranged to be movable along an axis perpendicular to the longitudinal axis of first elongated member 9. The second elongated member 16 is maintained perpendicular to the longitudinal axis of first elongated member 9 by engagement with slot 17 shown in dotted lines in locking and aligning member 14. Second elongated member 16 is shown with a slot 18 which extends over a substantial length of the second elongated member and determines the range that the second elongated member can move relative to locking and aligning member 14 and first elongated member 9. Depending on the design of locking and aligning member 14, the slot in the second elongated member may not be required. No measuring indicia are shown on second elongated member 16 but can be included if desired. The indicia can be in the United States System, the Metric System or an arbitrary system. The longitudinal axis of the first elongated member and the second elongated member are shown as 21 and 22 respectively.

A locking handle 19 in the form of a cross is shown in FIG. 2. However, other forms of locking handles such as ones having circular or oval shapes can be used. The shape of the locking handle is not critical as long as it can be easily operated.

The trussetter gauge can be made of metal, hard woods, plastics or combinations thereof. The materials should be sufficiently strong and rigid that the gauge is lightweight and durable. Metal or a combination of metal and plastic is preferred.

The first elongated member 9 and the second elongated member 16 as shown are long flat members. Generally a length from about 22 inches to about 48 inches for the first elongated member is sufficient to be suitable for most applications of the gauge. However, the first elongated member can be made in any length to be useful for special applications. The second elongated member can be any arbitrary length but a length in the range of about 14 inches to about 40 inches has been found useful for most applications.

The elongated members 9 and 16 are shown as long relatively flat members. However, other cross-section profiles can be used. The flat profile as shown preferably has a width of from about 0.75 inches to about 3 inches and a thickness of from about 0.15 inches to about 1 inch. The cross-section of the elongated member is dependent on its length and the material from which it is made.

FIG. 2A is an end view of marking end 11 showing marking edge 12 and first elongated member 9. Marking end 11 as shown in FIG. 2 is a trapezoidal design which provides a straight edge for marking the position at which the truss is to meet the marking on the wall or other support to provide the required uniform overhang. If the first elongated member 9 is sufficiently wide an end of the elongated member can comprise the marking end and marking edge. However, with narrow elongated members, for ease of use, an enlarged marking end is provided.

Figure 3:
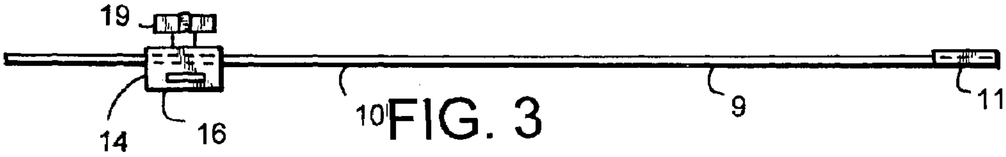
FIG. 3 is a diagrammatic representation of the trussetter gauge of FIG. 2 from the side.

FIG. 3 is a diagrammatic side view of an embodiment of the trussetter gauge 10 shown in FIG. 2.

As can be seen first elongated member 9 is shown as a relatively thin member in relation to its length and top surface.

The locking and aligning member 14 comprises a locking handle 19. The first elongated member 9 and the second elongated member 16 engage the locking and aligning member 14 and the two members are aligned at right angles by the member 14. The locking handle 19 can be released to permit the locking and alignment member 14 to move along the length of member 9 and permit movement of member 16 in relation to member 9. When in a required position locking handle 19 can be operated to lock the members 9 and 16 in the required position. The locking and aligning member 14 when loosened can be moved along elongated member 9 and elongated member 16 can be moved perpendicular to member 9, which in FIG. 3, extends perpendicular to the paper.

Figure 4:
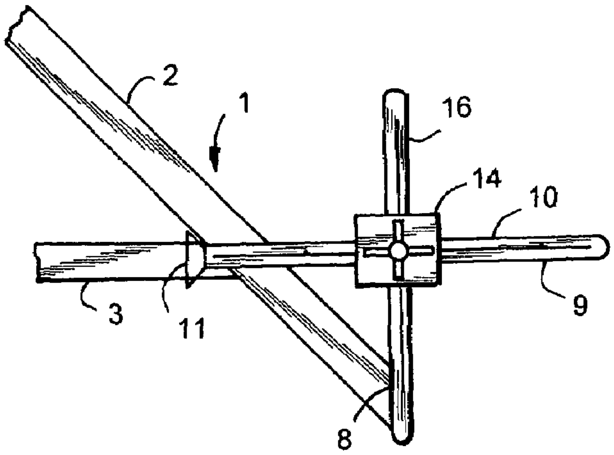
FIG. 4 is a diagrammatic representation of the trussetter gauge of the invention in a position for marking the crossbeam of a truss.

FIG. 4 shows trussetter 10 in a position to mark crossbeam 3 of truss 1. Locking and aligning member 14 has been tightened to maintain the position of member 14 and the relative position of elongated members 9 and 16. The side of member 16 is placed against the end 8 of sloping member 2 of truss 1 and marking end 11 is placed on the crossbeam 3 with the edge of member 9 parallel to the axis of the crossbeam. A line 6 is drawn on crossbeam 3 along edge 12 of marking end 11. The line is used to position the truss at a line drawn on the top plate 7 of the wall 5 as shown in FIG. 1.

Figure 5:
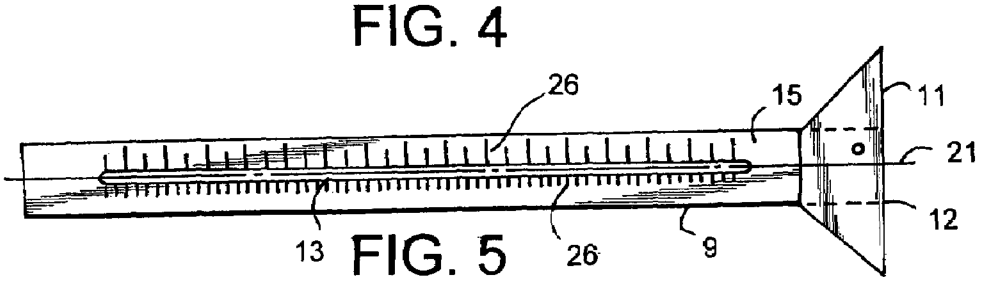
FIG. 5 is a plan view of the first elongated member.

FIG. 5 is a plan view of an embodiment of first elongated member 9 having the slot 13 and indicia 26 applied to top surface 15. As shown, indicia 26 can be in two different systems. Longitudinal axis 21 extends along a substantial length of member 9. A marking end 11 having marking edge 12 is shown in the form of a trapezoid but other shapes can be used as long as marking edge 12 is provided. When the elongated member is sufficiently wide to form a marking edge, a separate member is not required.

Figure 6:
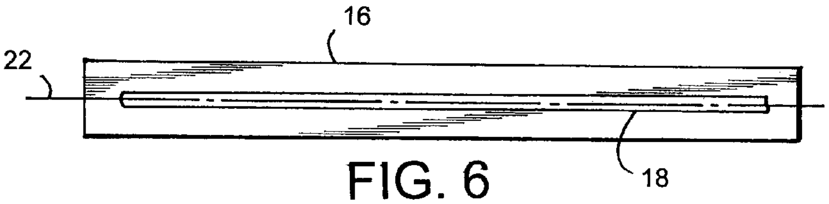
FIG. 6 is a plan view of the second elongated member.

FIG. 6 is a plan view of elongated member 16 showing slot 18 and longitudinal axis 22. elongated member 16 does not require indicia but indicia can be applied. Slot 18 is shown but is not required in all embodiments of the invention.

Figure 7:
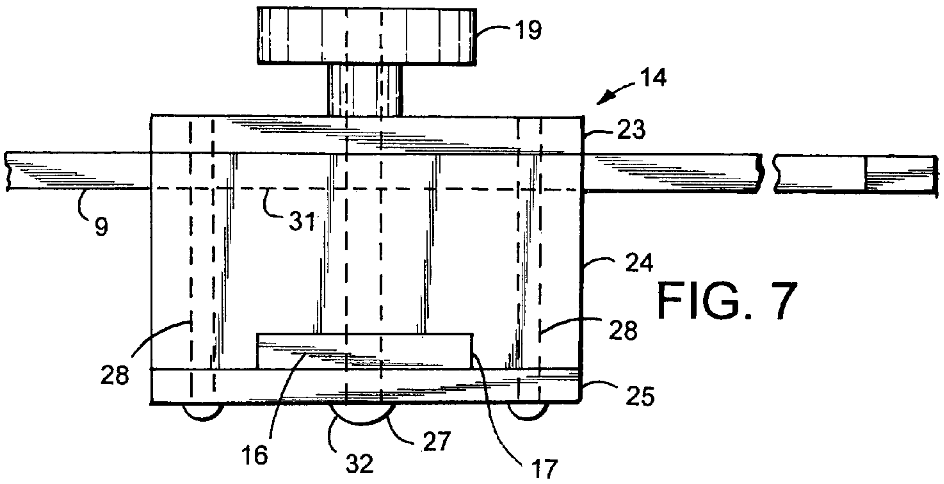
FIG. 7 is a partial front view of an embodiment of a trussetter gauge which is not foldable.

FIG. 7 is a partial side view of an embodiment of a non-folding trussetter gauge 10 of FIG. 2 showing in detail the structure of a locking and aligning member shown as 14.

Locking and aligning member 14 comprises a cover plate 23, a center block 24 having an alignment channel 31, shown in dotted lines, and an alignment channel 17 at right angles to each other. The top cover 23 and bottom cover 25 are loosely arranged on centerback 24 by bolts 28 which screwingly engage top cover plate 23. The cover plates are arranged so that when tension on end threaded bolt 27 is applied, the cover plate 23 and 25 are forced against elongated members 9 and 16 to lock them in place. This can be done by making channels 17 and 31 lesser in depth than the thickness of members 9 and 16 so that members 9 and 16 extend a small distance above the edges of alignment channels 31 and 17. Alternatively, cover plates 23 and 25 can be made of a material and thickness so that when tension is applied to end threaded bolt 27, cover plates 23 and 25 flex to a sufficient extent to lock elongated members 9 and 16 in place.

End threaded bolt 27 engages locking handle 19 so that turning handle 19 applies or releases tension from end threaded bolt 27. End threaded bolt 27 can be threaded adjacent to head 32 and engage threads in cover plate 25 to prevent bolt 27 from turning when locking handle 19 is rotated.

Figure 8:
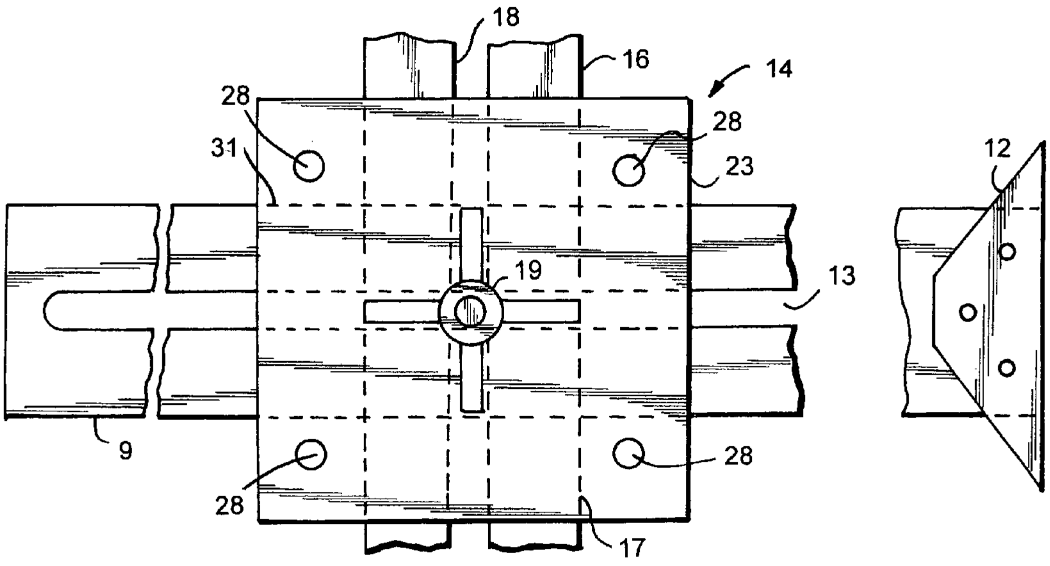
FIG. 8 is a top view of the trussetter gauge of FIG. 7.

FIG. 8 is a partial top view of the trussetter gauge of FIG. 7 showing slot 13 in elongated member 9 and slot 18 in elongated member 16. Slots 13 and 18 permit elongated members 9 and 16 to move past end threaded bolt 27 relative to locking and aligning member 14. However, slots are not required in some embodiments.

Figure 9:
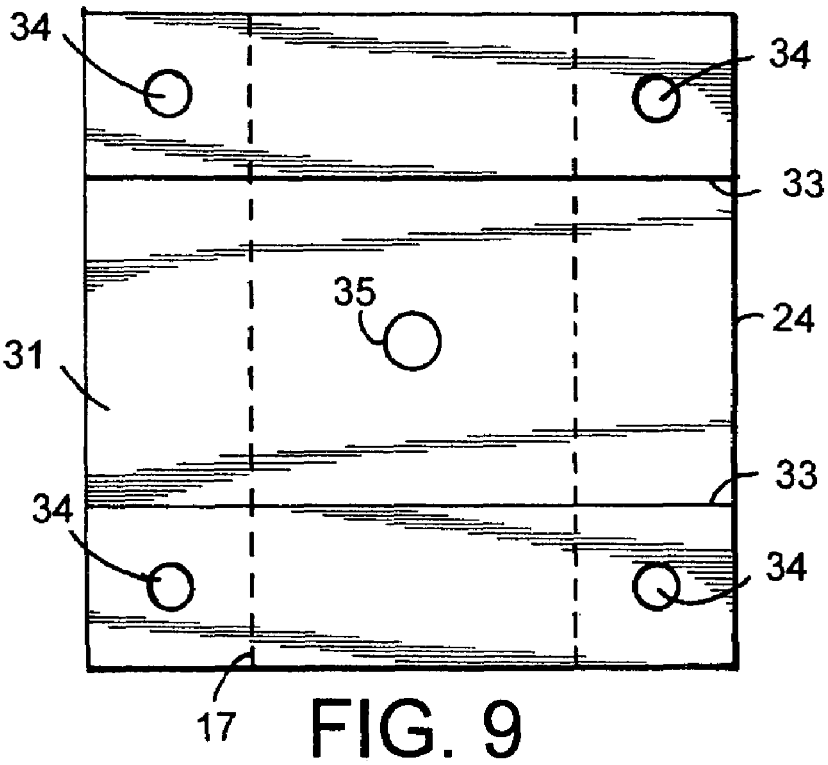
FIG. 9 is a top view of block 24 of FIG. 27.

FIG. 9 is a top view of center block 24 showing channel 31 having sides 33. Channel 17 at a right angle to channel 31 is shown in dotted lines. The bottom view of center block 24 is similar to the top view except that channel 17 at a right angle to channel 31 is shown in solid lines. Through holes 34 accommodate bolts 28. Through hole 35 accommodates end threaded bolt 27.

Figure 9A:
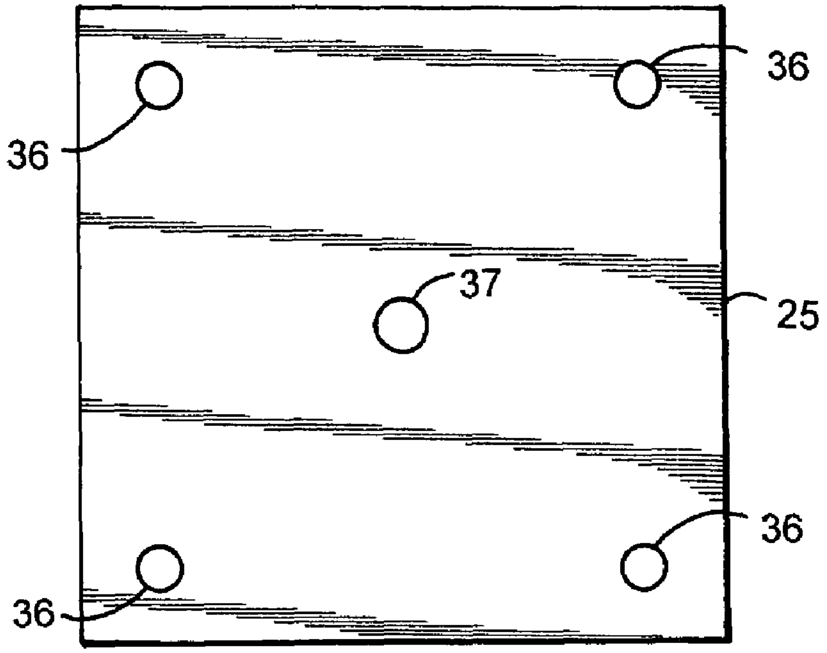
FIG. 9A is a top view of bottom plate 25.

FIG. 9A is a top view of bottom plate 25. Bottom plate 25 is essentially the same as top plate 23. However, through hole 37 in bottom plate 25 can optionally be threaded to engage threads on end threaded bolt 27 to prevent end threaded bolt 27 from rotating when locking handle 19 is rotated. Through holes 36 align with through holes 34 in center block 24 and through hole 37 aligns with through hole 35.

Elongated members 9 and 16 are aligned by channels 17 and 31 at right angles to each other. Top plate 23 and bottom plate 25 are loosely arranged on bolts 28 so that when locking handle 19 is tightened, elongated members 9 and 16 are locked in position in channels 31 and 17 respectively by contact with plates 23 and 25. The locking in place can be obtained by flexing of plates 23 and 25 or by making the elongated members slightly thicker than the depth of the channels 31 and 17. The elongated members can extend above the edges of the channels and can readily contact top plate 23 and bottom plate 25. The distance the elongated member extends above the edge or top of the channel is small—about 0.02 inches or less has been found to be sufficient. As shown, elongated member 9 is arranged in top channel 31 and elongated member 16 is arranged in bottom channel 17. However, the position of the elongated members can be reversed. The position of the elongated members can be reversed in any embodiment of the invention.

The trussetter gauge can be made from rigid materials such as hardwood, plastics, metals and combinations thereof. Metals such as steel, stainless steel, aluminum and magnesium have been found suitable, particularly steel and aluminum.

Figure 10:
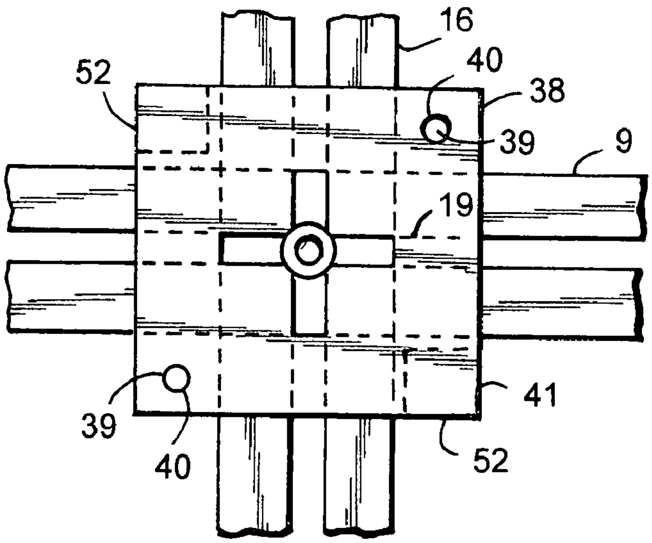
FIG. 10 is a partial top view of a foldable trussetter gauge.

FIG. 10 is a partial top view of an embodiment of a trussetter gauge of the invention which is foldable. As used herein the term foldable means that at least one elongated member can be moved from its position at a right angle to the other elongated member to a position in which their axes are closer to each other, preferably, their axes are substantially parallel to each other so that the trussetter gauge can be readily moved and stored. A foldable trussetter gauge and parts thereof are shown in FIGS. 10 to 15A.

The trussetter gauge of FIG. 10 comprises elongated members 9 and 16 and locking and aligning member 38 having locking handle 19. Elongated members 9 and 16 are shown in the open position. In FIG. 15A the trussetter gauge is shown in the folded position with elongated members 9 and 16 substantially parallel to each other.

Figure 11:
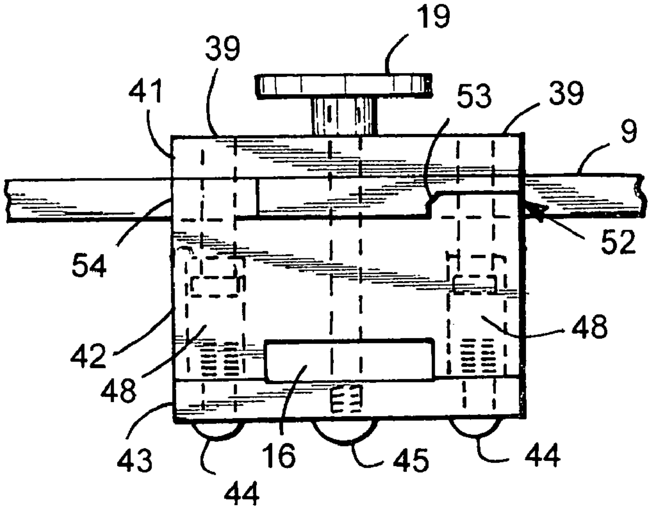
FIG. 11 is a partial front view of the trussetter gauge of FIG. 10.
Figure 12:
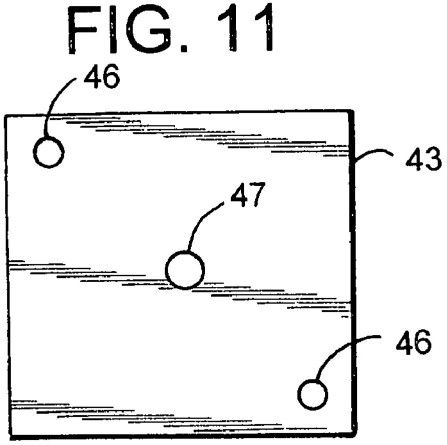
FIG. 12 is a top view of bottom plate of FIG. 10.

Top plate 41 has two threaded holes 40 at diagonally opposite corners to accommodate aligning bolts 39 which extend from channel posts 54 on center block 42. As shown in FIG. 11, aligning bolt 39 can be arranged by threading bolts 39 into threaded holes 40 in top plate 41 through holes 48 from the bottom of center block 42. The bolts 39 are shown in dotted lines in FIG. 11. As can be seen the heads of bolts 39 are not tightly engaged with the shoulder 30 in hole 48 which permits top plate 41 to move in a vertical direction to permit elongated member 9 to be rotated between the top plate 41 and the tops of channel posts 52 to a position where members 9 and 16 are essentially parallel. As shown posts 52 do not extend to the same height as posts 54 to permit easy passage of the elongated member between the top plate 41 and the top of posts 52. However, posts 52 can be the same height as channel posts 54.

Figure 15:
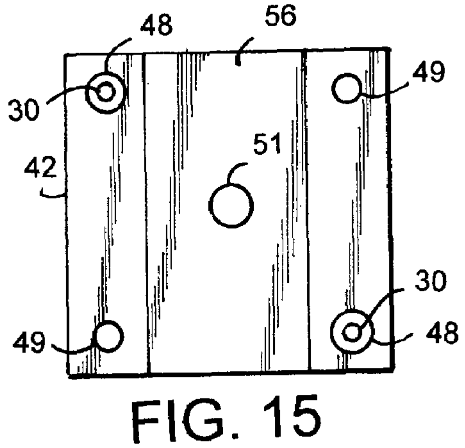
FIG. 15 is a bottom view of block 42 shown in FIGS. 10, 11 and 13.
Figure 15A:
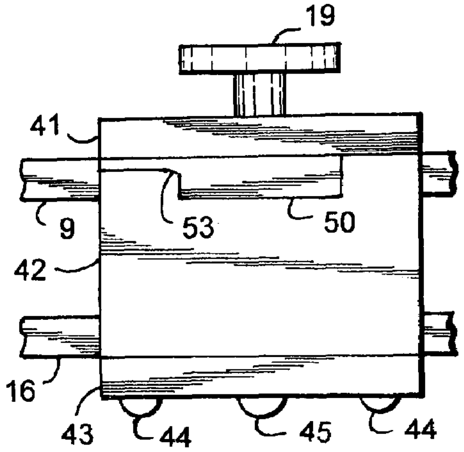
FIG. 15A is a partial side view of the trussetter gauge in a folded position.

As shown in FIG. 11 and FIG. 15, (FIG. 15 is a bottom view of center block 42), blind holes 49 are provided to engage bottom plate aligning bolts 44 which loosely support bottom plate 43 through holes 46. As shown in dotted lines in FIG. 11, aligning bolts 39 engage plate 41, that when locking handle 19 is rotated to release compression on top plate 41, top plate 41 can be moved upward a sufficient distance to permit elongated member 9 to clear the top of channel posts 52 without disengagement of top plate 41 from aligning bolts 39. Locking handle 19 engages threads on bolt 45 which can be optionally threaded to engage threads in hole 47 in bottom plate 43.

Figure 13:
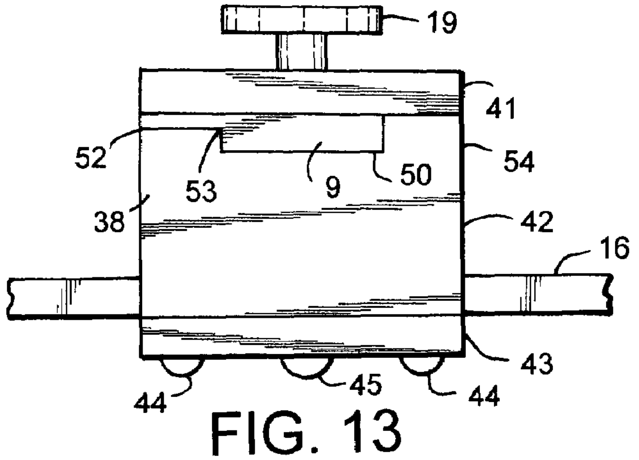
FIG. 13 is a side view of the foldable trussetter gauge of FIG. 10.

FIG. 13 is a partial side view, of the trussetter gauge of the invention, showing elongated member 9 extending perpendicular to the paper. Channel post 52 with chamfered edge 53 and channel post 54 delineate the sides of aligning channel 50.

Figure 14:
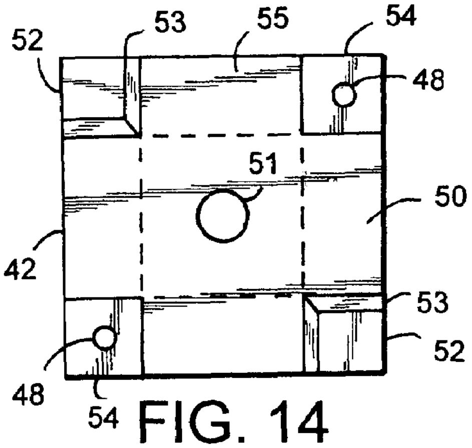
FIG. 14 is a top view of block 42 shown in FIGS. 10, 11 and 13.

FIG. 14 is a top view of center block 42 showing channel posts 52 with chamfered edges 53 and channel posts 54. Two chamfered edges on posts 52 are shown but one chamfered edge can be sufficient and none are required. Holes 48 accommodate aligning bolts 39 which extend through top plate 41 as shown in FIG. 10. Center block 42 provides two aligning channels 50 and 55 at right angles to each other. The elongated member 9 can be accommodated in either aligning channel 50 or 55. Aligning channel 50 is at right angles to aligning channel 56 shown in FIG. 15, and accommodates elongated member 9 when the trussetter gauge is in the unfolded on open position in condition for use. When the trussetter gauge is in the folded condition, the elongated member 9 is accommodated in aligning channel 55. As is obvious, elongated member 16 can be interchanged with elongated member 9 without affecting operation of the trussetter gauge of the invention. FIG. 15 shows through holes 48 with shoulder 30 for aligning bolts 39 and blind holes 49 for bottom plate support and aligning bolts 44.

When in use, the trussetter gauge is in the condition shown in FIGS. 10, 11 and 13. The gauge is unfolded and in condition for use. Elongated members 9 and 16 have been adjusted to the required conditions and locking handle 19 has rotated about bolt 45 to lock the locking and aligning member 38 at the desired position in relation to elongated members 9 and 16 which are in aligning channels 50 and 56 respectively.

When use of the trussetter gauge is finished the gauge can be folded for storage and easy transport by loosening locking handle 19 a sufficient amount to permit top plate 41 to move upward with aligning bolts 39 a sufficient distance to permit elongated member 9 to pass between the tops of post 52 and the bottom of top plate 41. Elongated member 9 is then rotated in a clockwise direction in relation to locking and aligning member 38 to pass over posts 52 and enter aligning channel 55. Locking handle 19 is then tightened to maintain elongated members in a folded condition wherein the elongated members are substantially parallel as shown in FIG. 15A.

The chamfered edges 53 of channel posts 52 facilitate rotation of the elongated member between the tops of channel posts 52 and the bottom of top plate 41. Due to the aligning bolts 39 elongated member 9 can only be rotated 90 degrees in a clockwise direction to fold the gauge and must be rotated 90 degrees in a counterclockwise direction to unfold the gauge for use. FIG. 15A is a partial side view of the trussetter gauge in a folded condition.

Foldability is a substantial asset of the invention since it facilitates transport and storage of the trussetter gauge.

FIGS. 16 through 21 illustrate a second embodiment of a locking and aligning member and a foldable trussetter gauge of the invention.

Figure 16:
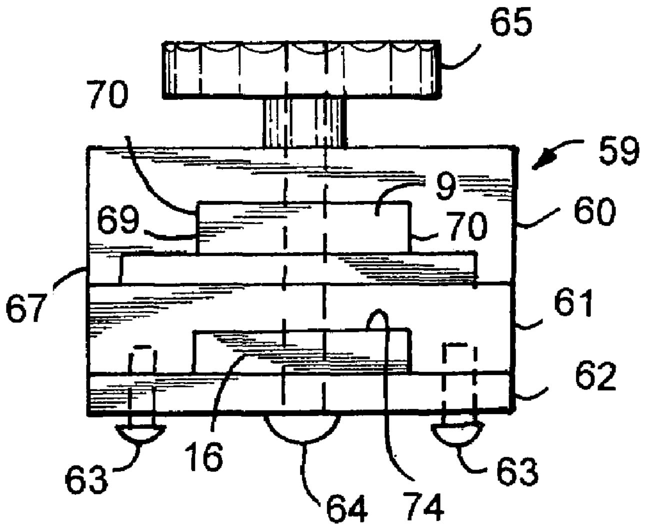
FIG. 16 is a front view of a second embodiment of a foldable trussetter gauge of the invention in a folded condition.
Figure 17:
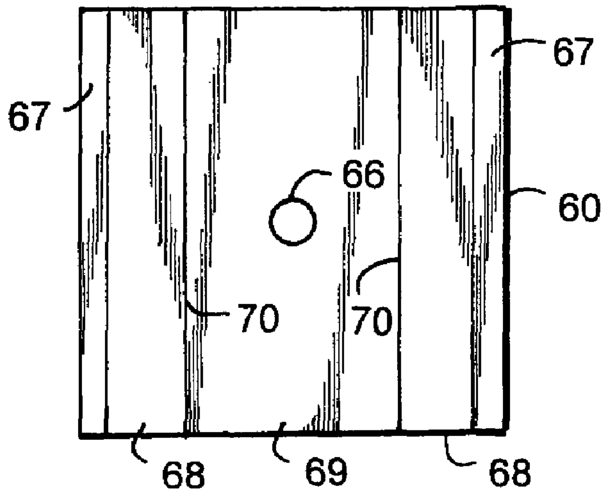
FIG. 17 is a bottom view of cover plat 60 of FIG. 16.
Figure 18:
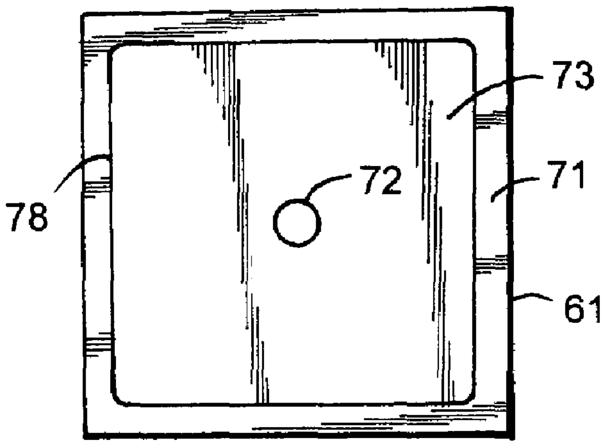
FIG. 18 is a top view of block 61 of FIG. 16.

FIG. 16 is a partial view of a second embodiment of a folding trussetter gauge of the invention in a folded condition showing locking and aligning member 59 comprising a top plate 60 having an aligning channel 69 with channel sides 70 for aligning and locking elongated member 9 in position. The trussetter gauge is shown in a folded position in FIG. 16 with elongated members in a position perpendicular to the plane of the paper.

Top plate 60 engages edges 78 of a raised plateau 73 on center block 61 by means of extensions 67 which provides a channel which includes channel 69 and the ledges 68. The extensions 67 engage the edges 78 of plateau 73 and aligns channel 69 either parallel to or at right angle to channel 74 in center block 61.

Figure 19:
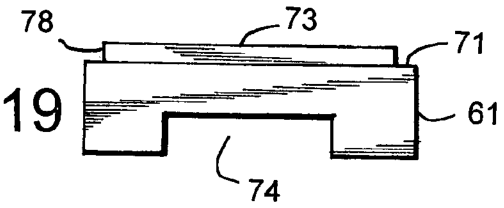
FIG. 19 is a side view of block 61 of FIG. 16.
Figure 20:
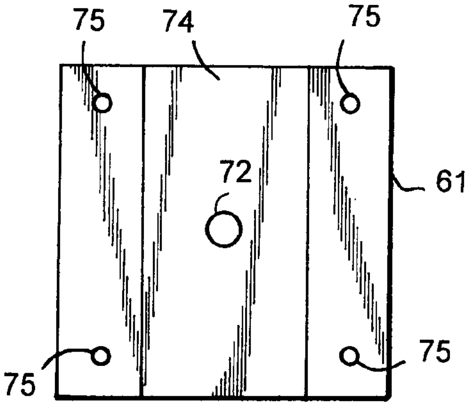
FIG. 20 is a bottom view of block 61 of FIG. 16.
Figure 21:
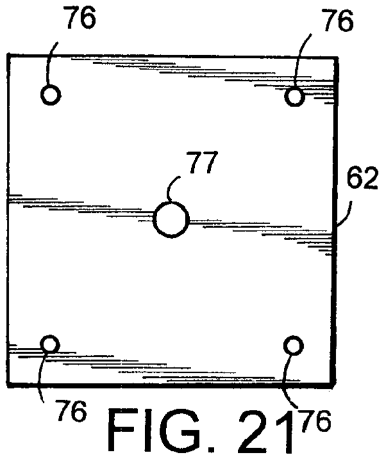
FIG. 21 is a top view of cover plate 62 of FIG. 16.
Figure 36:
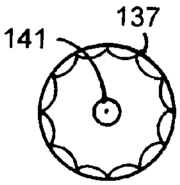
FIG. 36 is a top view of a circular locking handle.

Center block 61 contains channel 74 as shown in FIGS. 16, 19 and 20. Center block 61 has at least two blind holes (four are shown in FIG. 20) to accept bolts 63 for loosely supporting bottom plate 62. Center block 61 has a through hole 72 for engagement with end threaded bolt 64 which passes through hole 77 in bottom plate 62, and hole 66 in top plate 60 to engage locking handle 65 which as shown in FIG. 16 is a cylindrical handle such as shown in a top view in FIG. 36. When locking handle 65 is rotated to tighten the assembly, end threaded bolt 64 compresses the locking and aligning member to lock the elongated member 9 and 16 in position which as shown in FIG. 16 is in the folded position.

When trussetter gauge 59 is to be unfolded for use, locking handle 65 is rotated in a direction which relieves tension on end threaded bolt 64 and is loosened to a point where projections 67 on top plate 60 can clear the top of plateau 73, then top plate 60 is rotated to a position where channel 69 is perpendicular to channel 74 in center block 61. The locking handle 65 is then turned to apply tension to end threaded bolt 64 to cause projections 67 on top plate 60 to engage edges 78 of plateau 73 of center block 61.

As in the previous embodiments, the depth of channels 69 and 74 can be slightly less than the thickness of elongated members 9 and 16 so that locking pressure can be applied to elongated members 9 and 16 to prevent movement after they have been moved to the desired position. The difference in thickness of the elongated members and the depth of the channels is preferably less than 0.02 inches and preferably 0.01 inches or less.

In an alternate embodiment, top plate 60 and bottom plate 62 can be sufficiently flexible that when tension is applied to end threaded bolt 64, top plate 60 and bottom plate 62 can flex a sufficient amount to lock elongated members 9 and 16 in place.

Bolts 63 permit some travel of bottom plate 62 along the bolts so that elongated member 16 can be easily moved in channel 74, especially when elongated member 16 is thicker than the depth of channel 74.

Figure 22:
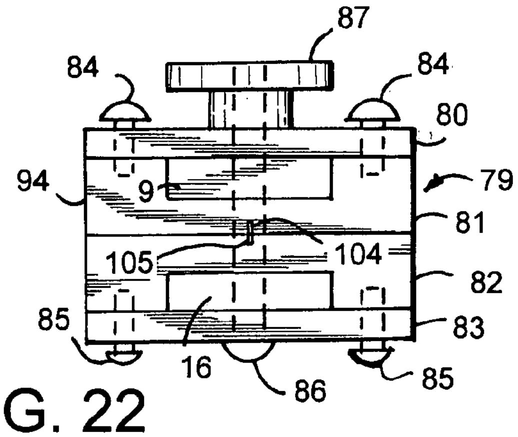
FIG. 22 is a partial view of a third embodiment of a foldable trussetter gauge of the invention in a folded condition.
Figure 23:
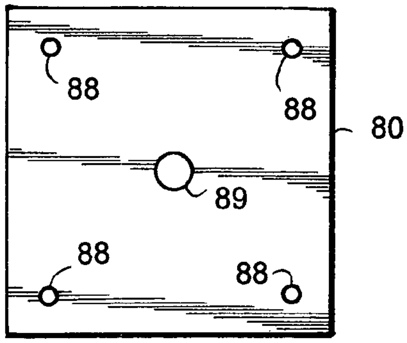
FIG. 23 is a top view of top plate 80 of FIG. 22.
Figure 24:
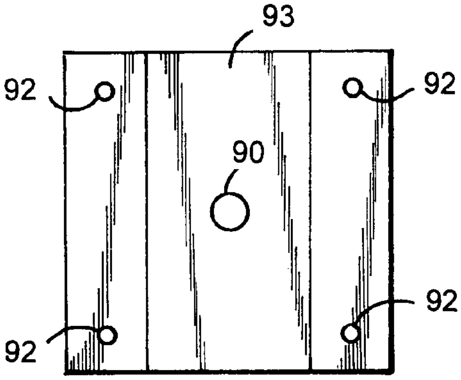
FIG. 24 is a top view of top rotating alignment member 81 of FIG. 22.
Figure 24A:
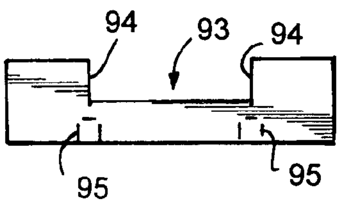
FIG. 24A is a side view of top rotating alignment member 81 of FIG. 22.

FIGS. 22 through 29 illustrate a third embodiment of a foldable trussetter gauge of the invention shown as 79 in a folded condition in FIG. 22 with elongated members 9 and 16 substantially parallel to each other and projecting perpendicular to the plane of the paper. The locking and aligning member 94 comprises a top plate 80, a top rotating alignment member 81, a bottom rotating alignment member 82, a bottom plate 83 and locking handle 87 which applies tension to end threaded bolt 86 to lock and align elongated members 9 and 16 in a desired position. Top plate 80 is loosely attached to top rotating alignment member 81 by bolts 84 which engage threaded blind holes 92 in rotating alignment member 81 shown in FIG. 24 by way of through holes 88 in top plate 80 (shown in FIG. 23). Top rotating alignment member 81 comprises aligning channel 93 with aligning sides 94 (FIG. 24A) and through hole 90 to permit passage of end threaded bolt 86. Detent accepting holes 95 are shown in dotted outline in FIG. 24A.

Figure 25:
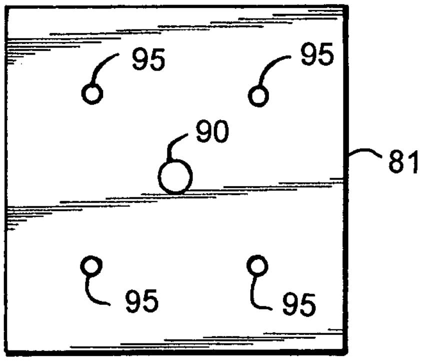
FIG. 25 is a bottom view of top rotating alignment member 81 of FIG. 22.
Figure 26:
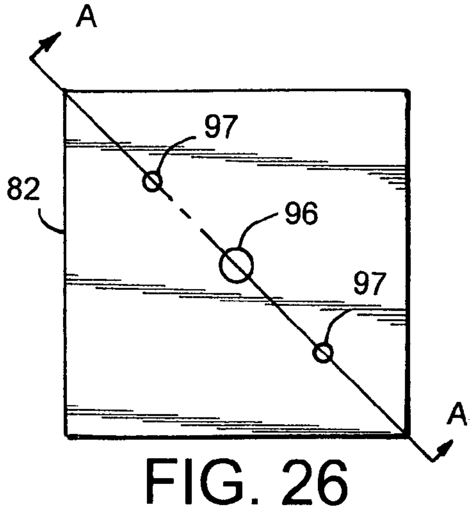
FIG. 26 is a top view of bottom rotating alignment member 82 of FIG. 22.
Figure 27:
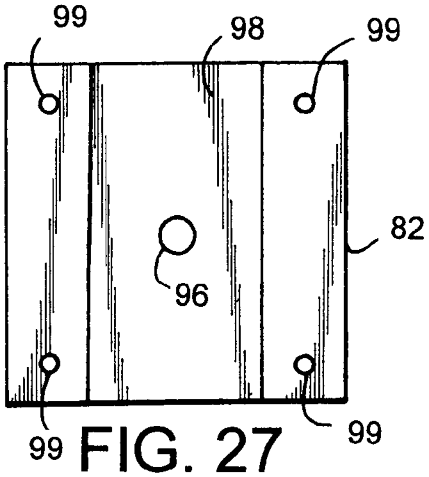
FIG. 27 is a bottom view of bottom rotating alignment member 82 of FIG. 22.
Figure 27A:
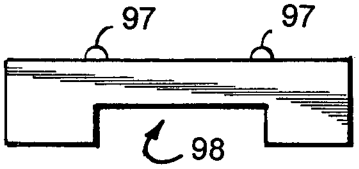
FIG. 27A is a side view of bottom rotating alignment member 82 of FIG. 22.
Figure 28:
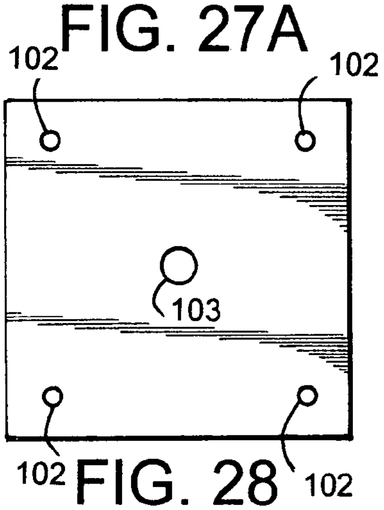
FIG. 28 is a top view of bottom cover plate 83 of FIG. 22.

FIG. 25 is a bottom view of top rotating alignment member 81 showing four detent accepting holes 95 and through hole 90. The bottom of top rotating alignment member 81 is arranged adjacent to the top of bottom rotating alignment member 82 shown in FIG. 26. Two spring loaded ball detents 97 and through hole 96 are shown in FIG. 26. Two spring loaded ball detents are shown but three or more spring loaded ball detents can be utilized. When the bottom of top rotating alignment member 81 is arranged adjacent to the top of bottom rotating alignment member 82, the spring loaded ball detents 97 engage holes 95 in top rotating alignment member 81 when the channel 93 of member 81 and channel 98 of member 82 are parallel or at right angles to each other. Top rotating alignment member 81 and bottom rotating alignment member 82 have essentially the same structure except that one member has detent accepting holes and the other member has the spring loaded detents. The use of detents to insure alignment is preferred but is not critical to the invention.

Top plate 80 is loosely attached to top rotating alignment member 81 by means of threaded bolts 84 threaded into blind holes 92. Bottom plate 83 is loosely attached to bottom rotating alignment member 82 by bolts 85 engaged with blind holes 99 arranged in through holes 102. End threaded bolt 86 passes through holes 103, 96, 90 and 89 and engages locking handle 87 which can be cylindrical as shown, in the form of a cross, an oval or any other shape which facilitates gripping for rotation to lock and unlock the elongated members.

To bring the trussetter gauge 79 from the folded condition shown in FIG. 22 to a condition for use, locking handle 87 is rotated to remove the tension on end threaded bolt 86 and permit the top rotating alignment member to be disengaged from spring loaded detents 97 and rotated ninety degrees to engage the spring loaded detents 97 with holes 95. The locking handle 87 is then rotated to apply tension to end threaded bolt 86 and cause contact between top plate 80 and elongated member 9 and between bottom plate 83 and elongated member 16. To facilitate contact, between the top and bottom plates and the elongated members, the thickness of elongated members 9 and 16 can be slightly greater than the depth of channels 93 and 98. In an alternate embodiment, the top and bottom plates are sufficiently flexible that tension on bolt 86 causes sufficient contact between the plates and elongated members. The top and bottom plates are loosely attached so that the top and bottom plates are not in compressive contact with the elongated members 9 and 16 when the tension is removed from end threaded bolt 86 so that the elongated members 9 and 16 can be easily moved through channels 93 and 98 to their desired positions.

Marks 104 and 105 as shown in FIG. 22 can be inscribed on member 81 and 82 so that proper alignment can be checked and assured. The marks 104 and 105 can be inscribed at four positions on one rotating alignment member and one position on the other rotating alignment member.

The trussetter gauge shown in FIGS. 22 to 29 can be readily folded and unfolded.

Figure 30:
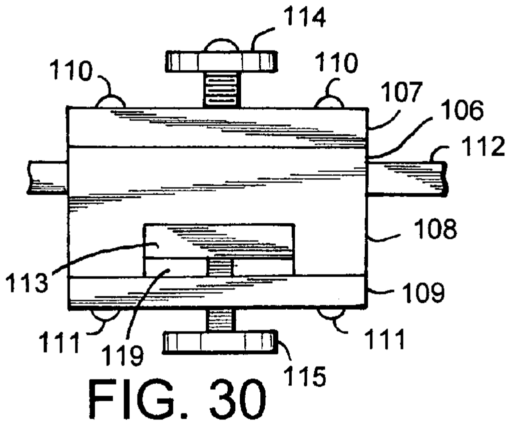
FIG. 30 is a partial side view of a nonfoldable trussetter gauge in which the first and second elongated member are independently lockable.
Figure 31:
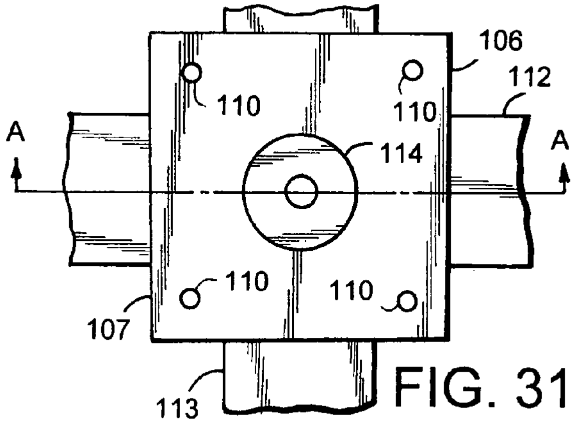
FIG. 31 is a top view of the embodiment shown in FIG. 30.
Figure 32:
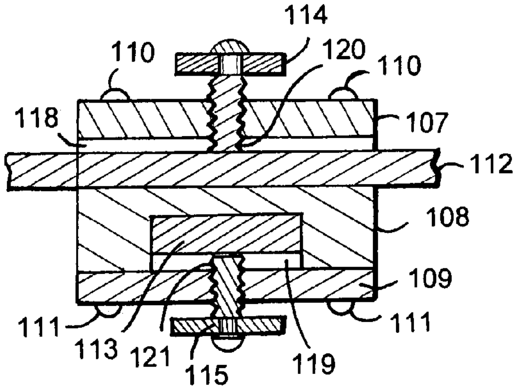
FIG. 32 is a view in cross section along the line A-A of FIG. 31.

FIGS. 30 to 32 show a partial view of a non-foldable trussetter gauge of the invention with independent adjustability of the first and second elongated members. The trussetter gauge comprises elongated members 112 and 113 arranged in locking and aligning member 106. Locking and aligning member 106 comprises top plate 107, center block 108 having aligning channels 118 and 119 at right angles to each other and bottom plate 109. Top plate 107 is mounted on center block 108 by bolts 110 and bottom plate 109 is mounted on center block 108 by bolts 111. Locking members 114 and 115 are screwingly engaged with cover plates 107 and 109 respectively. The top plates 107 and 109 are not required when aligning channels 118 and 119 are milled through a solid center block.

Center block 108 is similar in structure to center block 24 of FIG. 7 except that channels 118 and 119 can be considerably deeper than the thickness of elongated members 112 and 113 (See FIG. 32). The elongated members 112 and 113 are locked in a required position by rotation of locking members 114 and 115 to apply pressure to the elongated members between the ends 120 and 121 of locking members 114 and 115 and the bottom of aligning channels 118 and 119. Elongated members 112 and 113 can be moved by rotating locking members 114 and 115 to release the pressure and then moving the elongated members to another position and tightening the locking members to maintain the elongated members in the desired position.

FIG. 32 is a partial cross sectional view of the trussetter gauge of FIG. 31 along the line marked A-A. As can be seen in FIG. 32, the aligning channels 188 and 119 are much deeper than the thickness of elongated members 112 and 113 since they do not rely on contact with top plate 107 and bottom plate 109 to lock them in position.

The locking members 114 and 115 are shown with the screw ends 120 and 121 directly in contact with elongated members 112 and 113. However, to prevent marring of the surfaces of the elongated members, padded or expanded feet (not shown) can be provided on the ends 120 and 121.

Figure 34:
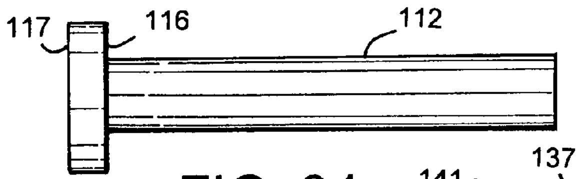
FIG. 34 is a plan view of a non-slotted first elongated member.
Figure 35:
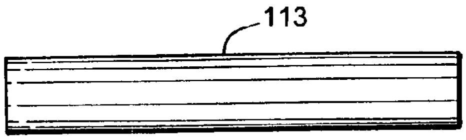
FIG. 35 is a plan view of a non-slotted second elongated member.

Since the locking and aligning member 106 does not have an end threaded bolt through its center, elongated members 112 and 113 shown in FIGS. 34 and 35 do not require the slots 13 and 18 shown in elongated members 9 and 16 shown in FIGS. 5 and 6. The elongated members can have measuring indicia on a surface as shown in FIG. 5.

Elongated member 112 as shown in FIG. 34 has extended marking end 116 with marking edge 117. The extended marking end is not required if the elongated member is sufficiently wide that the end can be used to indicate the position of the mark on the crossbeam and provide an edge for striking a line. As in the other embodiments, elongated member 112 and 113 can be interchanged and moved to the other channels.

Figure 33:
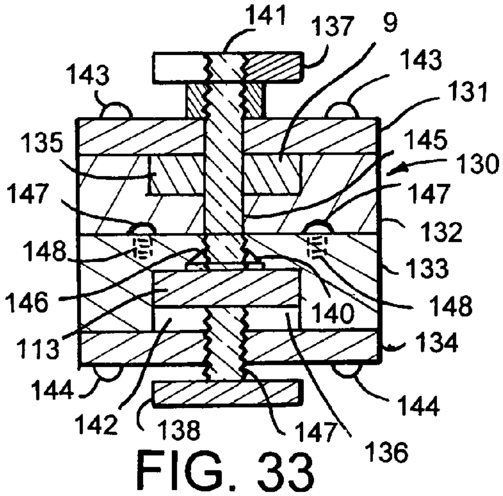
FIG. 33 is a view in cross section of a foldable trussetter gauge with independently lockable first and second elongated members in a folded position.

FIG. 33 is a cross-section of an embodiment of a foldable trussetter gauge in a folded condition. The elongated members 9 and 113 are shown perpendicular to the plane of the paper. The locking and aligning member 130 is similar in construction to the locking and aligning member shown in FIGS. 22 to 29, except that elongated members 9 and 113 are independently lockable.

The locking and aligning member 130 comprises a top plate 131, a top rotating alignment member 132, a bottom rotating alignment member 133 and a bottom plate 134. Top plate 131 is loosely attached to top rotating alignment plate 132 to permit movement of elongated member 9 in aligning channel 135 when tension is removed from end threaded bolt 141 by rotation of locking handle 137 which as shown in FIG. 33 has a cylindrical handle such as shown in the top view in FIG. 36. End threaded bolt 141 passes through holes 145 in top rotating alignment plate 133. The head of end threaded bolt 141 is in a countersunk opening 140 in bottom rotating alignment plate 133.

Elongated member 113 is arranged in aligning channel 142 which is covered by bottom plate 134. Locking member 138 has screw member 147 which is screwingly engaged with bottom plate 134. Rotation of locking member 138 applies or removes pressure on elongated member 113 in alignment channel 142 similar to the arrangement of the bottom plate in FIG. 32. Applying pressure to elongated member 113 locks the member in place in channel 142; removing pressure from elongated member 113 permits movement of elongated member 113 to a required position where it can be locked in place.

The bottom of top rotating alignment member 132 which is adjacent to the top of bottom rotating alignment member 133 contains four indent receiving openings 147 such as 95 shown in FIG. 25 which are shown in dotted lines. The top of bottom rotating alignment member 133 contains spring loaded indents 148, shown in dotted lines, which engage the openings in the bottom of top rotating alignment member 132. The spring loaded indents are similar to the spring loaded indents 97 shown in FIGS. 26 and 29. The use of detents to readily assure alignment of the alignment members is not required. They can be eliminated or replaced by other indexing means such as pins, side indents or the like.

To fold or unfold the trussetter gauge shown in FIG. 33, locking handle 137 is rotated to remove tension from end threaded bolt 141 to permit top rotating alignment member 132 to be rotated in relation to bottom rotating alignment member 133. The member 132 and 133 are rotated to a point where the spring loaded ball detents 148 engage holes 147 in top rotating alignment member 132. Elongated member 9 is moved to its required position and locking member 137 is rotated to apply tension to end threaded bolt 141 to lock elongated member 9 in place.

Elongated member 113 does not have a center slot as shown in FIG. 35 since there is no bolt member which passes through member 113. However, elongated member 9 has a center slot as shown in FIG. 5 to permit the member to clear end threaded bolt 141.

The term end threaded bolt means that the bolt need not require threads over its entire length. However, the bolt must have threads on at least the end engaged with the locking handle to permit rotation of the locking handle to, either by engagement with the top plate or engagement with the handle, apply tension to bolt 141. The bolt may also have threads near head 146 to lock the bolt into the end plate as shown in FIG. 11, or into the bottom rotating alignment member as shown in FIG. 33 to prevent rotation of the end threaded bolt when the locking handle is rotated. This feature is optional since other means can be used to prevent rotation of the end threaded bolt.

In use, a desired horizontal distance from the end of the sloping member of the truss to a position on the crossbeam, which is to match a position of a marking on the top plate of a wall, is determined. The trussetter is then set to correspond to the desired horizontal distance to the distance from the marking edge of the trussetter on the first elongated member to the edge of the second elongated member which is nearest the marking edge of the gauge. This can be easily done when the first elongated member carries indicia in the measuring system in which the desired horizontal distance is determined. The first and second elongated members are then locked in place. The second elongated member of the trussetter gauge is then placed against the end of the truss with the first elongated member parallel to the edge of the crossbeam and the crossbeam marked at the marking edge of the marking end of the first elongated member.

FIG. 37 to FIG. 41 is an embodiment of a foldable trussetter gauge having independently lockable first and second elongated members.

Figure 37:
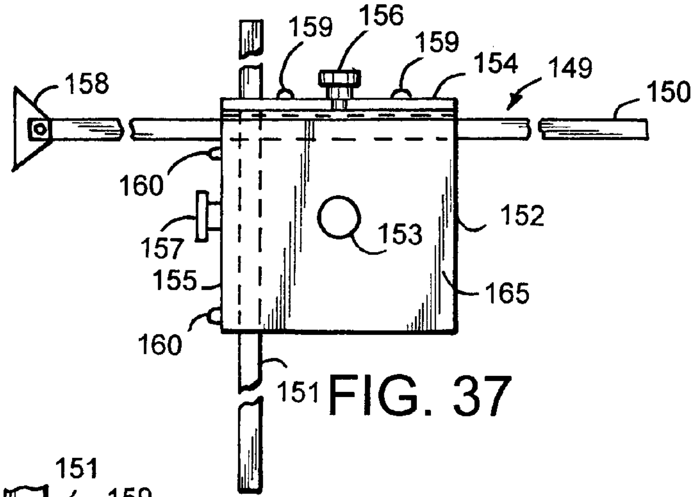
FIG. 37 is a partial plan view of a foldable trussetter gauge having independently lockable first and second elongated members.
Figure 38:
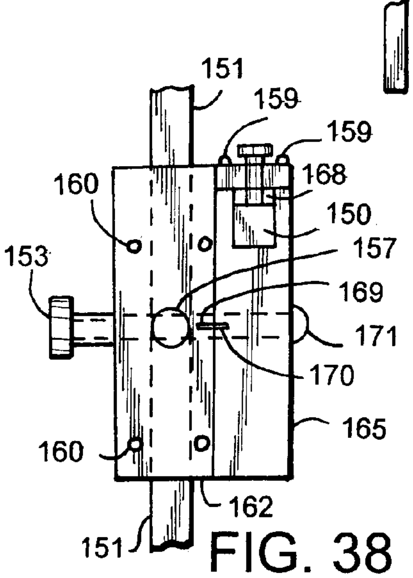
FIG. 38 is an end view from the left side of the trussetter of FIG. 37.
Figure 39:
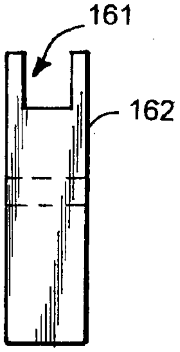
FIG. 39 is an end view of rotating alignment member 162.

FIG. 37 is a plan view of the trussetter gauge 149 of the invention in an unfolded condition. The trussetter gauge comprises first elongated member 150 and second elongated member 151 arranged in locking and aligning member 152. The first and second elongated members are arranged at right angles to each other.

The first elongated member 150 is mounted in aligning channel 168 in rotating aligning member 165. The channel is covered with cover plate 154 held in place by bolts 159. Locking member 156 is screwingly engaged with cover plate 154 so that rotation of locking member 156 applies or relieves pressure on elongated member 150 in channel 168.

The second elongated member is mounted in channel 161 (shown in FIG. 39) in rotating aligning member 162. The channel 161 is covered by cover plate 155 which is held in place by bolts 160. Locking member 157 screwingly engages cover plate 155 so that rotation of locking member 157 applies or relieves pressure on the second elongated member 151 in channel 161.

The two rotating and aligning members 162 and 165 are maintained in close contact by end threaded bolt 171 and locking member handle 153 which are arranged through holes 164 and 167. Rotation of locking member handle 153 applies or relieves tension on bolt 171 to cause rotating aligning members 162 and 165 to become more or less closely in contact.

Figure 29:
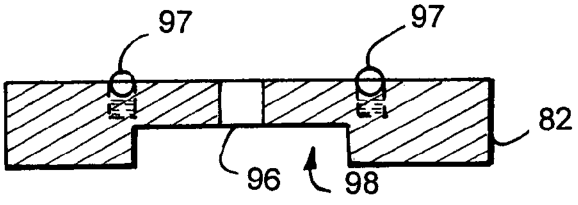
FIG. 29 is a view in cross section of bottom rotating alignment plate 82 along the ling A-A of FIG. 26.
Figure 40:
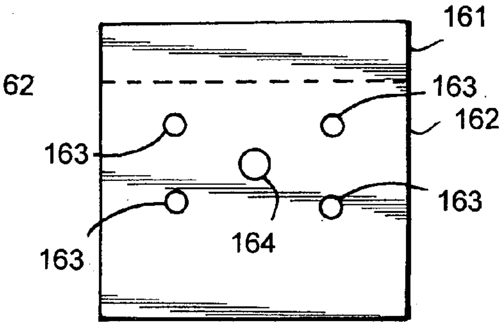
FIG. 40 is a plan view of the right side of the rotating alignment member 162 of FIG. 39 which engages member 165.
Figure 41:
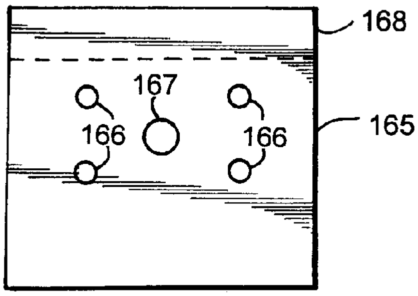
FIG. 41 is a plan view of the left side of rotating alignment member 165 showing spring loaded ball detects.

Rotating and alignment members 162 and 165 are the same except that one rotating and alignment member has detent openings shown as 163 in FIG. 40 and the other member has spring loaded ball detents 166 as shown in FIG. 41. When the rotating and aligning members are arranged so that channels 161 and 168 are parallel or at right angles to each other, the spring loaded ball detents engage the detent openings in the adjacent member. The pieces with the detent openings and the spring loaded detents can be interchanged. The spring loaded detents are well known and are shown in FIG. 29 as 97.

The first elongated member 150 has marking end 158. The trussetter gauge shown in FIG. 37 is particularly advantageous in that the first and second elongated members are independently adjustable and the locking and aligning member is for the most part outside of the area between the elongated members and the truss which permits easy use for trusses having members with low slopes.

The first and second elongated members in the embodiment shown in FIGS. 37 to 41 can have a cross-section which is more square than the similar members in the other embodiments. However, this wide cross-section can be used.

The first elongated member preferably carries measuring indicia on its top surface to facilitate setting the trussetter at the desired distance between the marking end and the edge of the second elongated member.

Each of rotating aligning member 162 and 165 can have marking indicia 169 and 170 (shown in FIG. 38) to indicate that the members are properly aligned to be certain that the first and second elongated member are parallel or perpendicular to each other. One member preferably has at least one indicia and the other member has at least two indicia.

I claim:

1. A foldable trussetter gage having a first elongated member having a first elongated axis and a marking end; a locking and aligning member movably engaged with the first elongated member; a second elongated member having a second longitudinal axis movably engaged with the locking and aligning member and arranged so that the locking and aligning member is movable along the first longitudinal axis of the first elongated member; the locking and aligning member being arranged to permit the first and second elongated members to be movable relative to each other and to releasably lock the first and second elongated members in a fixed relationship: wherein, the locking and aligning member comprises a block comprising at least three aligning channels, a first aligning channel being perpendicular to an adjacent second aligning channel and a third aligning channel; wherein, at least one elongated member can be arranged in the first or second aligning channel whereby the trussetter gage is placed in a folded or unfolded condition.

2. The trussetter gage of claim 1 wherein the first and second aligning channels are separated by posts which define the channels.

3. The trussetter gage of claim 2 wherein the first and second aligning channels are separated by four posts, two of the posts are shorter than two adjacent posts.

4. A foldable trussetter gage which comprises: a foldable article having only two elongated members, a first elongated member having a first longitudinal axis and a marking end; a locking and aligning member comprising an aligning channel for movably engaging the first elongated member, a second elongated member having and elongated axis, movably engaged with an aligning channel of the locking and aligning member and arranged so that the locking and aligning member is at least movable along the first longitudinal axis of the first elongated member; the locking and aligning member being arranged to permit the first and second elongated members to be movable relative to each other and to releasably lock the first and second elongated members in a fixed right angle relationship, wherein the locking and aligning member comprises a top plate having an aligning channel for the first elongated member and side extensions; a center block having a raised plateau edges and an aligning channel for the second elongated member, the side extensions arranged to engage the plateau edges; and a locking member which releasably engages the locking and aligning member to maintain the first and second elongated members in a fixed relationship.

5. A trussetter gage which comprises: a first elongated member having a first elongated axis and a marking end; a locking and aligning member movably engaged with the first elongated member; a second elongated member having a second longitudinal axis movably engaged with the locking and aligning member and arranged so that the locking and aligning member is movable along the first longitudinal axis of the first elongated member; the locking and aligning member being arranged to permit the first and second elongated members to be movable relative to each other and the releasably lock the first and second elongated members in a fixed right angle relationship, wherein, the locking and aligning member comprises a center block having a first aligning channel for the first elongated member and a second aligning channel for the second elongated member, the first and second aligning channels being at right angels to each other; and a locking member for releasably applying a force individually to each of the first and second elongated members to releasably lock them in a fixed position relative to each other.

* * * * *